Nov. 30, 1954  A. E. FOREIT  2,695,853
METHOD OF SEALING THE SPLICED ENDS OF ELECTRIC CABLES
Filed April 3, 1953
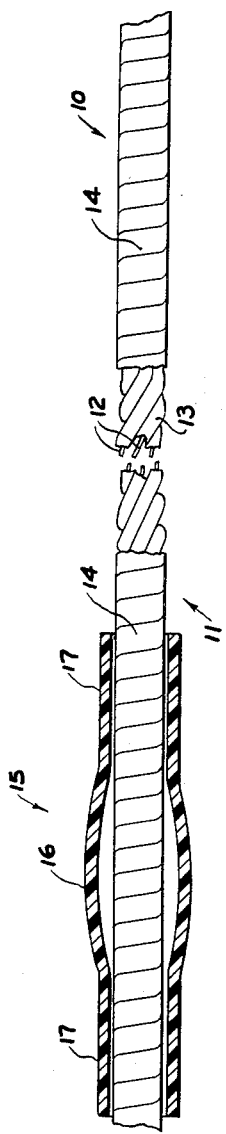
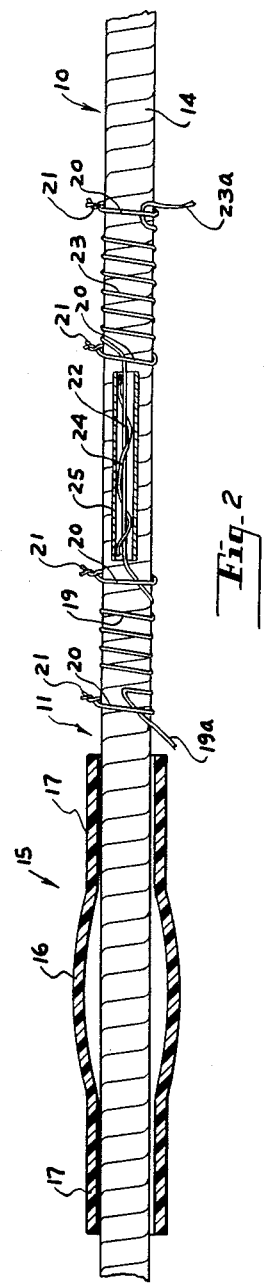
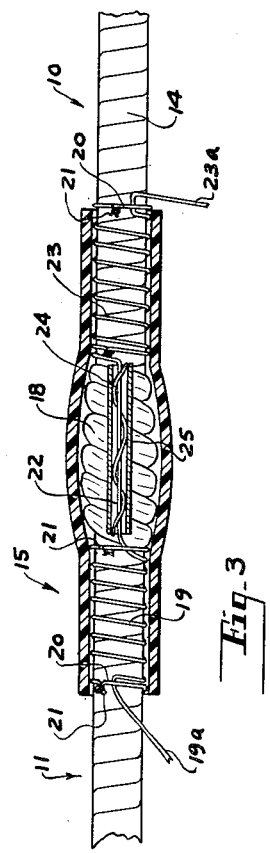
INVENTOR.
ALBERT E. FOREIT.
BY *Louis Chayka*
ATTORNEY.

United States Patent Office 2,695,853
Patented Nov. 30, 1954

2,695,853

METHOD OF SEALING THE SPLICED ENDS OF ELECTRIC CABLES

Albert E. Foreit, Detroit, Mich.

Application April 3, 1953, Serial No. 346,767

4 Claims. (Cl. 154—2.22)

My improvement relates to electric cables of the type which is used in the underground conduits and which includes a plurality of current carrying conductors enclosed in an outer jacket. Up to now most of such jackets were made of a soft bendable material such as lead. In cases where two lengths of a cable had to be spliced, it was necessary not only to connect the respective conductors, to insulate them by wrapping them or by coating them with a suitable dielectric medium, but to enclose the spliced ends of the cables by a suitable protective sleeve joined to their outer jackets. As a rule, especially when the sleeve had to be molded as when it had to be made out of molten metal, the process required a number of tools and utensils, making the task slow, tedious and expensive.

To eliminate the above drawbacks and difficulties, my concept calls for cables comprising an outer sheathing or jacket made of a pliable plastic, and for application over the spliced ends of the cables of a plastic sleeve. Furthermore, my improvement calls for having the end portions of the sleeve fused to the outer sheathing of the cables. The sleeve itself and the manner of its application is designed to result in a number of advantages over the present practice. The sleeve will be cheap in cost, easy to apply as its application does not involve the use of any gums, cements or sticky adhesive substances, and because of absence of such substances, it will be easy to remove. It will also eliminate pressure on individual conductor joints within the splice.

I shall now describe my improvement with reference to the accompanying drawings, in which Fig. 1 is a plan view of two lengths of a cable in an end to end arrangement prior to being spliced, the view including a plastic sleeve upon one of the cables, the sleeve being shown in a longitudinal section;

Fig. 2 shows the same cables after they have been spliced the view including a plastic sleeve in the same position as that shown in Fig. 1, and a wiring applied to the cables at both ends of the splice;

Fig. 3 shows the same cables with the sleeve in place over the splice, the view including the above said wiring.

Similar numerals refer to similar parts throughout the several views.

The cables to be spliced are generally indicated by numerals 10 and 11, respectively. In the drawings the cables are shown in an end to end arrangement, each cable including a plurality of current conducting wires 12, each in a coating 13 made of a pliable dielectric material. The wires are disposed in a helically twisted relation to each other, and are encased in an outer sheathing 14. The sheathing contemplated herein is to be made of a synthetic material such as polyvinyl chloride or some other suitable plastic. The splicing itself is carried out in the usual manner, including removal of the outer coating 13 from individual wires 12, joining the wires of one cable with the individual wires of the other cable by soldering or other means, wrapping the joints with a paper tape or some other substance, and providing an outer jacket over the splice. It will be understood that my improvement pertains only to the jacket and to the manner of its placement over the spliced ends of the cables.

The jacket or sleeve, employed by me is to be made of a suitable plastic such for example as the above said polyvinyl chloride, this being the material which is already in use for the formation of the outer sheathing of cables of the kind described herein. To allow for the enlarged diameter of the cable expanded by splicing, the sleeve, generally indicated by numeral 15, includes an expanded midportion 16 and two end portions 17, the latter being of a diameter sufficiently reduced to fit over the unspliced portions of the cable.

Assuming that the ends of the cables to be spliced, have been alined, it will be necessary to slip said sleeve 15 endwise over the end of one of the cables shown in Fig. 1. This having been done, the ends of the cables are spliced according to the best present practice, the splicing including, if so desired, tape wrappers 18 over the joined conductors, this step being but suggestive and forming no part of my invention. As a next step, a length of high resistance wire, such as nickel chrome wire, is coiled about the cable at one end of the splice in convolutions spaced from each other, the coil so formed being marked 19. To prevent a longitudinal shift of said convolutions or of the coil as a whole, I secure the coil in place upon the cable by means of wire binders 20, each of which consists of a piece of wire tied about the cable over the respective end portion of said coil 19 as best shown in Fig. 2. The ends of the binder are twisted about each other as shown at 21.

A straight length 22 of said high resistance wire, in continuation from said coil 19, is laid along the splice, and a sufficient additional length of the wire is allowed to have it formed into a coil 23 at the other end of the splice. However before the last named coil is made, a piece of a low resistance conductor made of such a metal as copper, is wound about the straight portion 22 of said high resistance wire to make a few widely spaced turns thereabout. The conductor marked 24, is to bridge the spacing between the coil 19 and the coil 23 which still remains to be made. Preferably the ends of said conductor 24 ought to be brought into an intimate contact with the ends of said straight piece of high resistance wire to provide a low resistance path for passage of electric current between the ends of said straight piece 22. Next, an insulating jacket preferably made of asbestos or cotton, is drawn over the conductor and said straight length 22 of high resistance wire as shown in Fig. 2 where the jacket is identified by number 25. It is only after the jacket has been placed in the above described position, that the coil 23 is made and secured in place by means of binders 20. This having been done, the sleeve 15 is drawn over the splice so that the expanded midportion thereof will embrace the splice itself while the end portions 17 of said sleeve will be located over the coils 19 and 23, snugly embracing the cable within.

At this stage the outer ends 19a and 23a of the coils are connected to the terminals of a storage battery or some other source of electric current by means of which the coils are to be heated to a degree sufficient to cause the inner surface of the sleeve 15 at its outer end portions 17 to fuse with the outer surface of the protective sheathing 14 of said cable.

Once the sleeve has been thus fused in place, the outer ends of said coils 19 and 23 are to be cut off close to the ends of the sleeve 15, this being the final step of the method described herein.

It will be understood that some changes may be made in the method disclosed herein without departing from the inventive concept thereof. What I therefore wish to claim, is as follows:

1. A method of enclosing the spliced portion of two adjoining lengths of a cable provided with an outer sheathing made of a plastic, the method comprising slipping a plastic sleeve over one end of the cable to be spliced, effecting a splice, winding about the cable at one end of the splice a length of a thin wire of high electric resistance into a coil, extending a length of said wire to the other end of the splice, forming a coil out of said wire about the cable at said end, pulling the plastic sleeve over the splice for a tight fit over the high resistance wires at both ends of the splice, connecting the outer ends of the high resistance wires to opposite terminals of a source of electric current, sending electric current through said high resistance wires to generate enough heat to fuse the end portions of the sleeve with the plastic sheathing of the cable, discontinuing application of said current, and cutting off the high resistance wires at the ends of the sleeve.

2. A method of sealing a plastic sleeve over the spliced portion of an electric cable having an outer jacket made of a plastic, the method comprising, coiling a length of high resistance wire over the cable at one end of the splice, extending the wire in a straight line along the splice, coiling a length of the wire about the cable at the other end of the splice, joining the coils by a low resistance conductor, enclosing the straight length of the high resistance wire extending in a straight line and the low-resistance conductor with a heat insulating jacket, applying a plastic sleeve over the splice and the coils at both ends thereof, connecting the outer ends of the high resistance wire with the opposite terminals of a source of electric current, causing the current to flow through said high resistance wires to heat them and to fuse thereby the end portions of the sleeve to the plastic jacket of the cable, discontinuing the flow of the current, and cutting off the high resistance wires at the ends of the sleeve.

3. A method of sealing a sleeve over the spliced portion of an electric cable including a plastic outer jacket, the method comprising, winding a length of high resistance wire over the cable at one end of the splice, winding a length of the same kind of a wire over the cable at the other end of the splice, joining the two lengths of high resistance wire by a low resistance conductor, applying a plastic sleeve over the splice and the adjoining portions of the cable to cover said high resistance wires at both ends of the splice, connecting the outer ends of the high resistance wires to the opposite terminals of a source of electric current, causing the current to flow over the high resistance wires and the low resistance conductor to generate sufficient heat to fuse the sleeve to the plastic jacket of the cable at both ends of the splice, discontinuing the flow of said current and cutting off the ends of the high resistance wires close to the ends of the sleeve.

4. A method of enclosing the spliced portion of two adjoining lengths of a cable provided with an outer sheathing made of a plastic, the method comprising slipping a plastic sleeve over one end of the cable to be spliced, effecting a splice, winding about the cable, at one end of the splice, a length of a thin wire of high electric resistance into a coil, extending a length of said wire to the other end of the splice, encasing said length in a heat-insulating jacket, forming a coil out of said wire about the cable at said end, pulling the plastic sleeve over the splice for a tight fit over the high-resistance wires at both ends of the splice, connecting the outer ends of the high-resistance wires to opposite terminals of a source of electric current, sending electric current through said high-resistance wires to generate enough heat to fuse the end portions of the sleeve with the plastic sheathing of the cable, discontinuing application of said current, and cutting off the high-resistance wires at the ends of the sleeve.

References Cited in the file of this patent

UNITED STATES PATENTS

| Number | Name | Date |
| --- | --- | --- |
| 1,216,654 | Burke | Feb. 20, 1917 |
| 2,509,929 | Kleinfelder | May 30, 1950 |